United States Patent
Luo et al.

(10) Patent No.: US 7,574,028 B2
(45) Date of Patent: *Aug. 11, 2009

(54) METHOD FOR RECOGNIZING PROJECTION VIEWS OF RADIOGRAPHS

(75) Inventors: Hui Luo, Rochester, NY (US); Jiebo Luo, Pittsford, NY (US)

(73) Assignee: Carestream Health, Inc., Rochester, NY (US)

( * ) Notice: Subject to any disclaimer, the term of this patent is extended or adjusted under 35 U.S.C. 154(b) by 647 days.

This patent is subject to a terminal disclaimer.

(21) Appl. No.: 11/284,993

(22) Filed: Nov. 21, 2005

(65) Prior Publication Data

US 2006/0110021 A1    May 25, 2006

Related U.S. Application Data (60) Provisional application No. 60/630,287, filed on Nov. 23, 2004, provisional application No. 60/630,286, filed on Nov. 23, 2004, provisional application No. 60/630,270, filed on Nov. 23, 2004, provisional application No. 60/630,326, filed on Nov. 23, 2004.

(51) Int. Cl.
G06K 9/00 (2006.01)
(52) U.S. Cl. ........................ 382/128; 382/159
(58) Field of Classification Search .......... 382/132, 382/159, 128, 170, 173, 129–131
See application file for complete search history.

(56) References Cited

U.S. PATENT DOCUMENTS

| 5,633,511 | A | | 5/1997 | Lee et al. |
| 5,862,249 | A | * | 1/1999 | Jang et al. ................ 382/132 |
| 6,055,326 | A | * | 4/2000 | Chang et al. ............. 382/132 |
| 2006/0064017 | A1 | * | 3/2006 | Krishnan et al. ........... 600/450 |

OTHER PUBLICATIONS

Luo et al., "Knowledge-based Image Understanding and Classification System for Medical Image Database", 2002, Proceeding of the SPIE, vol. 4684, pp. 1224-1234.*
Morse et al., "Multiscale Medical Analysis of Medical Images", 1994, Iamge and Vision Compuing, vol. 12 No. 6, 327-338.*
Ahmed et al., "Two-Stage Neural Network For Volume Segmentation of Medical Images", 1997, IEEE, vol. 3, pp. 1373-1378.*
U.S. Appl. No. 10/993,055, filed Nov. 19, 2004, Luo et al.
U.S. Appl. No. 60/630,270, filed Nov. 23, 2004, Luo et al.
U.S. Appl. No. 60/630,286, filed Nov. 23, 2004, Luo et al.
U.S. Appl. No. 60/630,326, filed Nov. 23, 2004, Luo et al.
I. Kawashita et al., Development of Computerized Method for Automated Classification of the Body Parts in Digital Radiographs, RSNA 2002.
M. O. Guld et al., Comparison of Global Features for Categorization of Medical Images, SPIE Medical Imaging 2004.
W. Niblack et al., The QBIC Project: Querying Images By Content Using Color, Texture, and Shape, SPIE vol. 1908 (1993) pp. 173-187.

(Continued)

*Primary Examiner*—Aaron W Carter (57) ABSTRACT

A method for recognizing the projection view of radiographs comprising the steps of correcting the orientation of the input radiograph, locating a region of interesting in the radiograph, recognizing the projection view of the radiograph.

9 Claims, 8 Drawing Sheets

OTHER PUBLICATIONS

A. Pentland et al., Photobook: Content-Based Manipulation of Image Databases, International Journal of Computer Vision, Fall 1995 (Jun. 12, 1995).

Jeffrey R. Bach et al., The Virage Image Search Engine: An open framework for image management, SPIE vol. 2670, pp. 76-87.

John R. Smith et al., VisualSEEk: a fully automated content-based image query, ACM Multimedia 96, Boston, MA Nov. 20, 1996.

Wei-Ying Ma et al., NeTra: A toolbox for navigating large image databases, Multimedia Systems 7: (1999) pp. 184-198.

Tom Huang et al., Multimedia Analysis and Retrieval System (MARS) Project, Proc of 33rd Annual Clinic on Library Application of Data Processing Digital Image Access and Retrieval, 1996.

B. S. Morse et al., Multiscale Medical Analysis of Medical Images, Image and Vision Computing, vol. 12, No. 6, Jul./Aug. 1994, pp. 327-338.

John M. Boone et al., Recognition of Chest Radiograph Orientation for Picture Archiving and Communications Systems Display Using Neural Networks, Journal of Digital Imaging, vol. 5, No. 3, Aug. 1992, pp. 190-193.

Xiaohui Wang et al., Automatic and Exam-Type Independent Algorithm for the Segmentation and Extraction of Foreground, Background, and Anatomy Regions in Digital Radiographic Images, Medical Imaging—Proceedings of SPIE, vol. 5370, pp. 1427-1434.

Bryan S. Morse et al., Multiscale Medical Analysis of Medical Images, Image and Vision Computing, vol. 12, No. 6, pp. 327-338, Jul./Aug. 1994.

\* cited by examiner

METHOD FOR RECOGNIZING PROJECTION VIEWS OF RADIOGRAPHS

CROSS REFERENCE TO RELATED APPLICATIONS

Reference is made to, and priority is claimed from, U.S. Provisional Application No. 60,630,287, entitled "METHOD FOR RECOGNIZING PROJECTION VIEWS OF RADIOGRAPHS", filed on Nov. 23, 2004 in the names of Luo et al, and which is assigned to the assignee of this application, and incorporated herein by reference.

Reference is further made to commonly assigned application U.S. Provisional Application No. 60/630,286, entitled "AUTOMATED RADIOGRAPH CLASSIFICATION USING ANATOMY INFORMATION", provisionally filed on Nov. 23, 2004 in the names of Luo et al, and which is assigned to the assignee of this application, and incorporated herein by reference.

Reference is further made to commonly assigned application U.S. Provisional Application No. 60/630,270, entitled "METHOD FOR AUTOMATIC SHAPE CLASSIFICATION", provisionally filed on Nov. 23, 2004 in the name of Luo, and which is assigned to the assignee of this application, and incorporated herein by reference.

Reference is also made to commonly assigned application U.S. Provisional Application No. 60/630,326, entitled "METHOD FOR CLASSIFYING RADIOGRAPHS", provisionally filed on Nov. 23, 2004 in the names of Luo et al, and which is assigned to the assignee of this application, and incorporated herein by reference.

FIELD OF THE INVENTION

This invention relates generally to techniques for processing radiographs, and more particularly to techniques for automatically recognizing the projection view of radiographs.

BACKGROUND OF THE INVENTION

The importance of recognizing the projection view of radiographs includes the following two aspects. Firstly, it can help automate the image rendering procedure and optimize the image display quality. According to the workflow of a Computer Radiograph (CR) system, a technologist takes radiographs ordered in an examination, and then scans each CR cassettes while manually typing in the projection view associated with the cassette. This projection view information, together with the body part information which is obtained when the examination is ordered, determine the characteristics of the radiograph and directly influence the choice of image rendering parameters. Therefore, the success of recognizing the projection view of radiograph can help eliminate the need of the radiologist input, automate the image rendering process, and expedite the workflow. Secondly, projection view recognition can also benefit image management in Picture Archiving and Communication Systems (PACS). For example, if the projection view information is derived automatically from the image contents, it could reduce the occurrence of missing or incorrect information in image header and make the medical image management system in PACS more rational and efficient.

However, recognizing the projection view of radiographs is a challenging problem as radiographs are often taken under a variety of examination condition. The patient's pose and size could be variant; so is the preference of radiologist depending on the patient's situation. All these factors would cause radiographs from the same examination to appear quite different. Human beings tend to use high level semantics to identify the projection view of a radiograph by capturing the image contents, grouping them into meaningful objects and matching them with contextual information (i.e. a medical exam). However all these analysis procedures are difficult for computer to achieve in a similar fashion due to the limitation of the image analysis algorithms.

Some attempts have been made toward projection view recognition of medical images. For example, I. Kawshita et. al. ("Development of Computerized Method for Automated Classification of Body Parts in Digital Radiographs", RSNA 2002) present a method to classify six body parts. The method examines the similarity of a given image to a set of predetermined template images by using the cross-correlation values as the similarity measure. However, the manual generation of these template images is quite time consuming, and more particularly, it is highly observer dependent, which may introduce error into the classification. Guld et. al. ("Comparison of Global Features for Categorization of Medical Images", SPIE medical Imaging 2004) discloses a method to evaluate a set of global features extracted from images for classification. In both methods, no preprocessing is implemented to reduce the influence of irrelevant and often distracting data. For example, the unexposed regions caused by the blocking of the x-ray collimator during the exposure may result in a significant white borders surrounding the image. Applicants have noted that if such regions are not removed in a pre-processing step and therefore used in the computation of similarity measures, the classification results can be seriously biased.

Recent literature focuses on natural scene image classification. Examples include QBIC (W. Niblack, et al, "The QBIC project: Querying images by content using color, texture, and shape" Proc. SPIE Storage and Retrieval for Image and Video Databases, February 1994), Photobook (A. Pentland, et. al. "Photobook: Content-based manipulation of image database". International Journal of Computer Vision, 1996), Virage (J. R. Bach, et al. "The Virage image search engine: An open framework for image management" Proc. SPIE Storage and Retrieval for image and Video Database, vol 2670, pp. 76-97, 1996), Visualseek (R. Smith, et al. "Visualseek: A fully automated content-based image query system" Proc ACM Multimedia 96, 1996), Netra (Ma, et al. "Netra: A toolbox for navigating large image databases" Proc IEEE Int. Conf. On Image Proc. 1997), and MAR (T. S. Huang, et. al, "Multimedia analysis and retrieval system (MARS) project" Proc of $33^{rd}$ Annual Clinic on Library Application of Data Processing Digital Image Access and Retrieval, 1996). These systems follow the same computational paradigm which treats an image as a whole entity and represents it via a set of low-level features or attributes, such as color, texture, shape and layout. Typically, these feature attributes together form a feature vector and image classification based on clustering these low-level visual feature vectors. In many cases, the most effective feature is color. However, the color information is not available in radiographs. Therefore these methods are not directly suitable for radiograph projection view recognition.

Given the limitations of the prior art, there exists a need for a method to automatically recognize the projection view of radiographs. Such a method should be robust enough to handle large variations in radiographs.

SUMMARY OF THE INVENTION

The object of the present invention is to provide an automated method for recognizing the projection view of radiographs.

According to the present invention, this objective is achieved by the following steps: correcting the orientation of the radiograph, extracting a region of interest from the radiograph, and recognizing the projection view of radiograph. In addition, pre-processing the input radiograph can be accomplished.

Preprocessing an input radiograph comprises sub-sampling the original image, segmenting the image into foreground, background and anatomy, and normalizing the image intensity based on characteristics of the anatomy.

Correcting the orientation of radiograph comprises detecting the orientation of the radiograph and reorienting the radiograph accordingly.

Extracting a region of interest from the radiograph includes detecting the medial axis of the anatomy, determining the center, size and shape of a region of interest and locating the region of interest in the radiograph.

Recognizing the projection view of radiograph is accomplished by classifying the radiograph with respect to all possible views and combining the classification results to determine the most likely projection view of radiograph.

The present invention provides some advantages. For example, features of the method promote robustness. Preprocessing of radiographs helps avoid the interference from the collimation areas and other noise. In addition, features used for orientation classification are invariant to size, translation and rotation. Features of the method also promote efficiency. For example, the processes can be implemented on a sub-sampled coarse resolution image, which greatly speeds up the recognition process.

BRIEF DESCRIPTION OF THE DRAWINGS

The foregoing and other objects, features, and advantages of the invention will be apparent from the following more particular description of embodiments of the invention, as illustrated in the accompanying drawings. The elements of the drawings are not necessarily to scale relative to each other.

FIGS. 3A-3E illustrate diagrammatic views showing the results from the preprocessing step.

FIGS. 4A-4C show diagrammatic views illustrating the detection of the medial axis of an anatomy.

FIGS. 5A-5B show diagrammatic views illustrating the shape of the region of interest (ROI).

DETAILED DESCRIPTION OF THE INVENTION

The following is a detailed description of the preferred embodiments of the invention, reference being made to the drawings in which the same reference numerals identify the same elements of structure in each of the several figures.

Figure 1A:
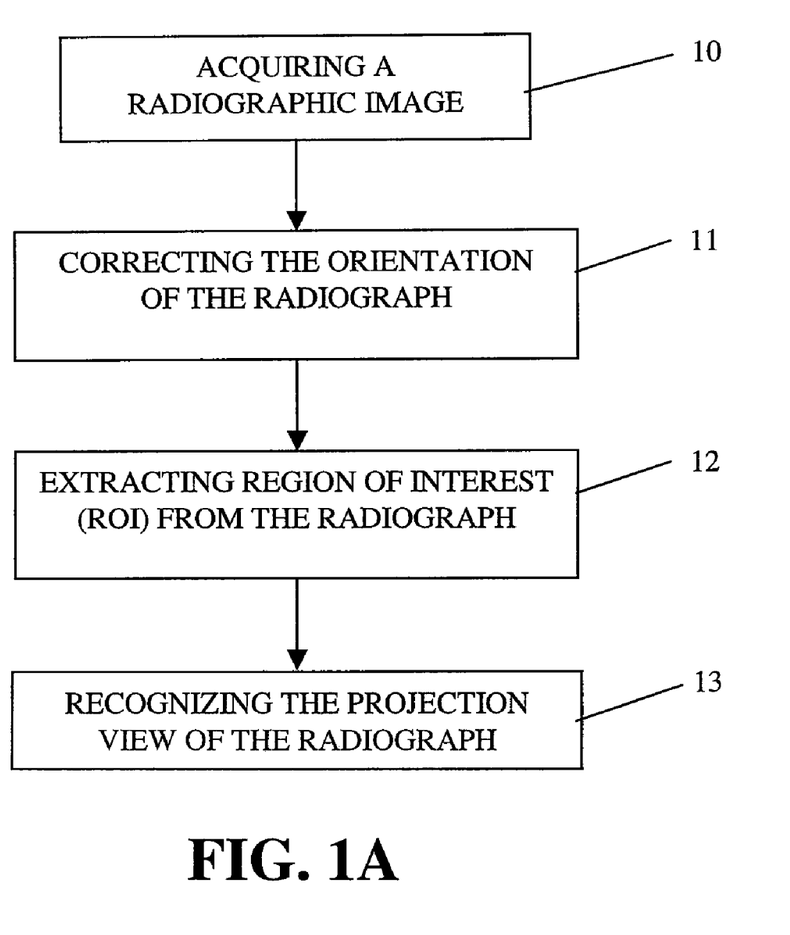
FIGS. 1A, 1B and 1C show flow charts illustrating the automated method for recognizing the projection view of radiographs.

The present invention discloses a method for automatically recognizing the projection view of radiographs. A flow chart of a method in accordance with the present invention is shown in FIG. 1A. As shown in FIG. 1A, the method includes three stages: correcting the orientation of radiograph (step 11); extracting a Region of Interest (ROI) from the input radiograph (step 12); and recognizing the projection view of the radiograph (step 13).

Figure 1B:
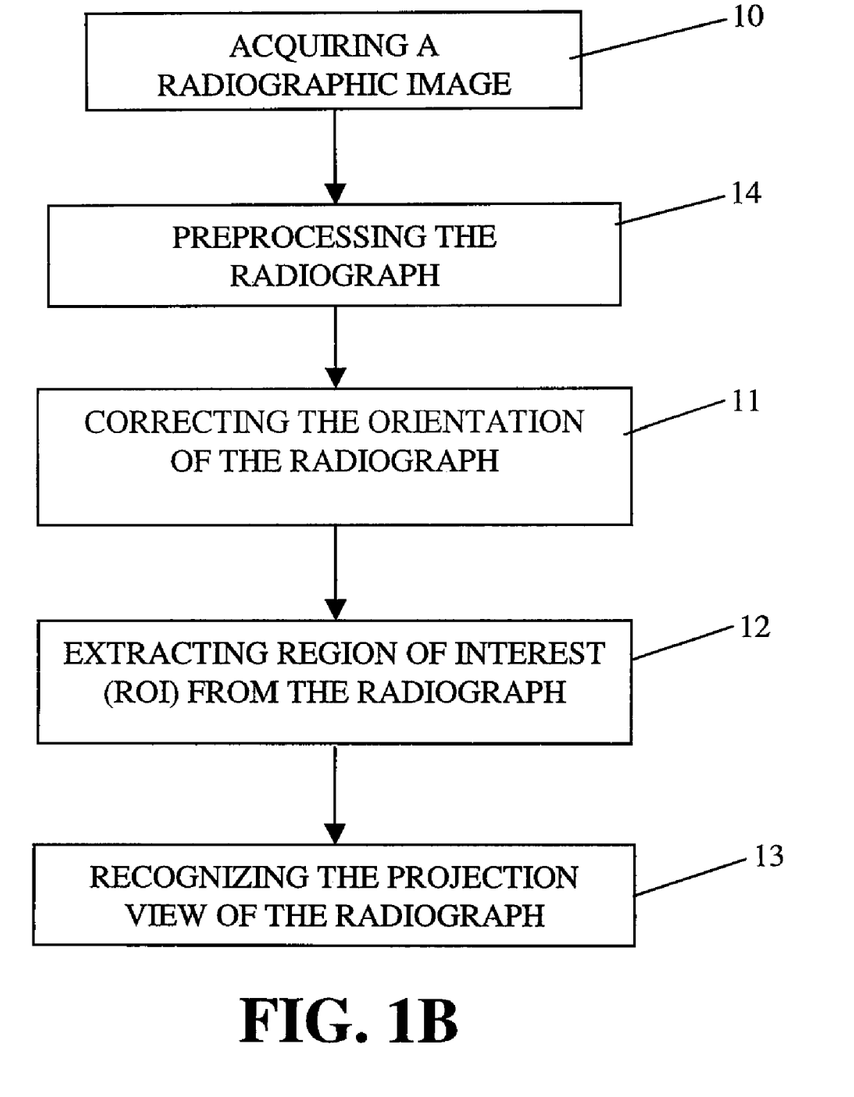

In a further embodiment of the present invention, shown in the flow chart of FIG. 1B, an additional step can be applied prior to the image orientation correction. This additional step (step 14) is the preprocessing of radiographs, and will be more particularly described below.

Figure 1C:
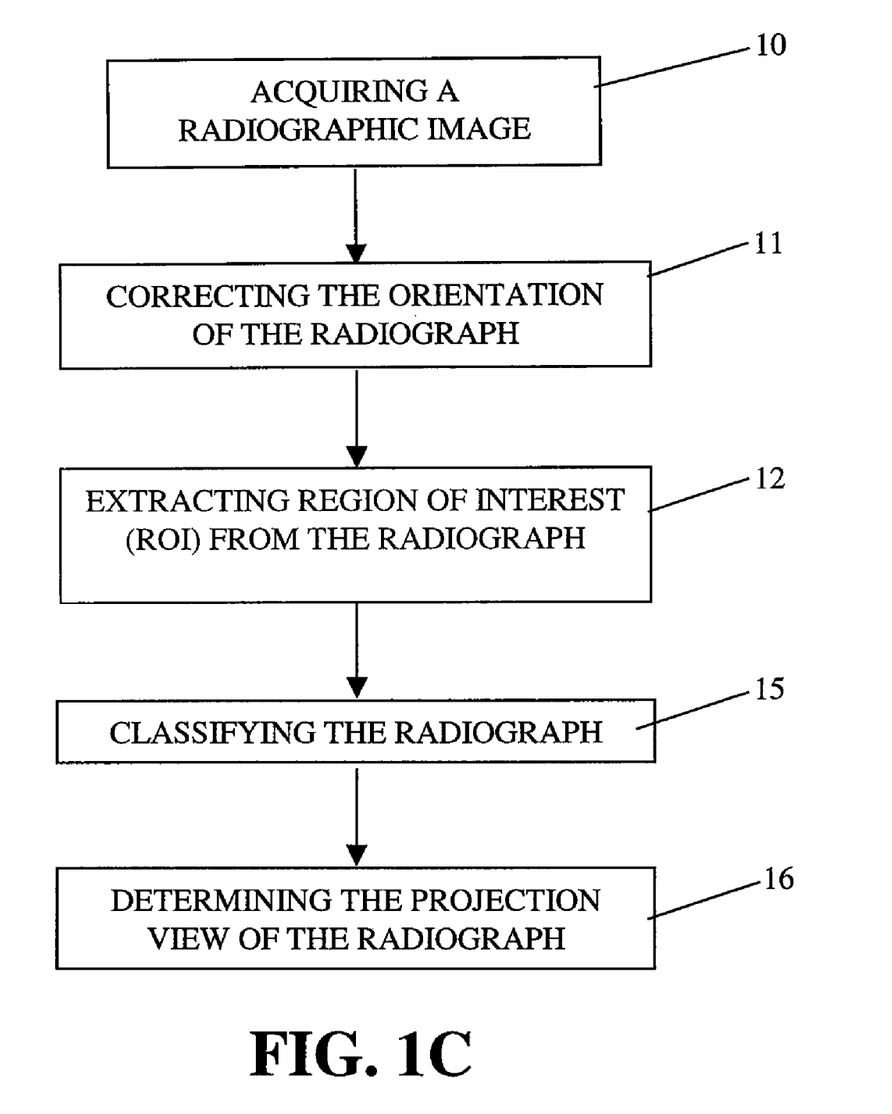

In a still further embodiment, shown in the flow chart of FIG. 1C, the step of recognizing the projection view of radiograph (i.e., step 13) can include two steps: 1) classifying the radiograph using a set of features and pre-trained classifiers, each classifier trained to recognize one projection view (step 15); 2) determining the projection view of radiographs by combining the classification results (step 16).

Figure 2:
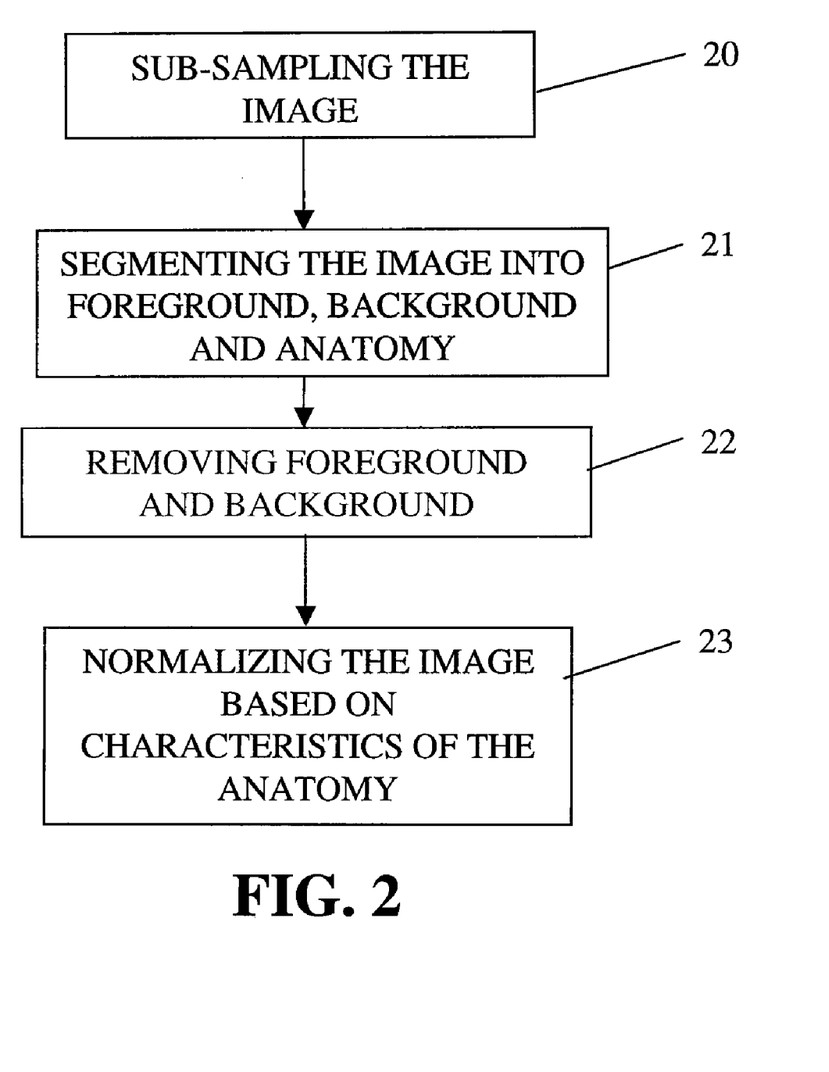
FIG. 2 is a flow chart illustrating the preprocessing step.

Referring now to FIG. 2, there is shown a flow chart illustrating step 14, the step for preprocessing radiographs. The purpose of preprocessing includes three aspects: (1) minimizing the number of pixels that need to be processed, but without degrading the performance of recognition; (2) reducing the interference from collimation areas (foreground) and direct exposure areas (background), so that the orientation recognition is driven by the diagnostically useful part of image data (anatomy); and (3) generating a consistent intensity and contrast image for the subsequent processes.

Still referring to FIG. 2, the method step for preprocessing radiographs starts with sub-sampling the original image to a small-size coarse resolution image (step 20). The sub-sampled image is then segmented into foreground, background, and anatomy regions (step 21). Later, the foreground and background regions are removed from the image (step 22), and only the anatomy region is kept for further processing. Finally, the result image is normalized based on the intensity range of the anatomy region (step 23).

Figure 3A:
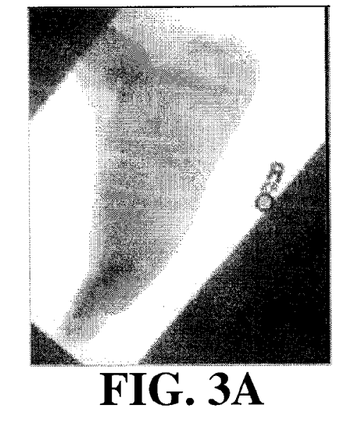
FIG. 3A displays the original image of a radiograph.
Figure 3B:
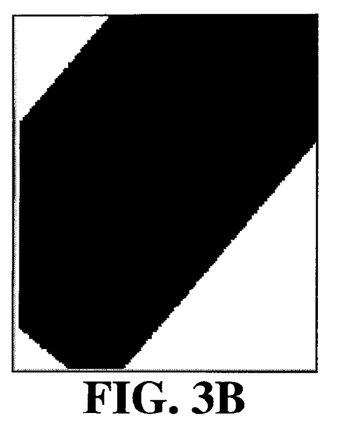
FIGS. 3B-3D depict its corresponding foreground, background and anatomy images from the segmentation, respectively.
Figure 3C:
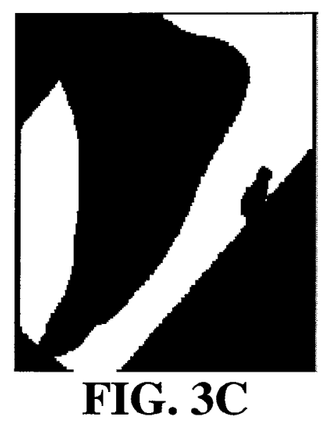
Figure 3D:
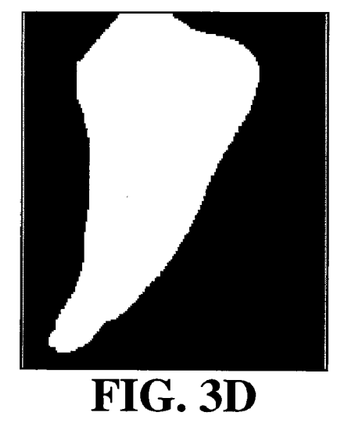

Sub-sampling the original image (step 20) can be performed by known methods used for reducing image size while preserving enough information for orientation recognition. In one embodiment of the present invention, a Guassian pyramid data structure is employed to generate sub-sampled images Image segmentation (step 21) can be accomplished by using methods known to those skilled in the art. One such segmentation method is to find two thresholds from the image histogram, then segment the image into foreground, background and anatomy regions. FIG. 3A shows an exemplary radiograph and FIGS. 3B-3D show its foreground, background and anatomy images obtained from segmentation.

Once the image is segmented, the foreground and background regions are removed from the sub-sampled image (step 22). This can be accomplished by setting the pixels in these regions to a pre-defined value, with the pixels in the remaining anatomy region kept unchanged. As a result of this step, the preprocessed image contains the diagnostically useful part of image data, therefore the interference from collimation areas can be minimized and the intensity range of anatomy region can be accurately detected.

Figure 3E:
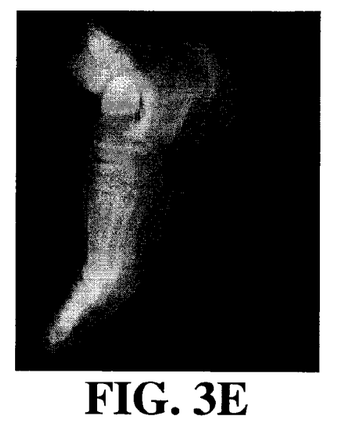
FIG. 3E displays the normalized image to emphasize the anatomy.

According to the present invention, image intensity normalization (step 23) is performed over the image in order to compensate for difference in exposure densities caused by patient variations and examination conditions. One technique to achieve normalization is to detect minimum and maximum brightness values from the image histogram, preferably computed from pixels in the anatomy region, then apply a linear or log transfer function to adjust the image brightness into a pre-defined range. Histogram equalization could be further performed on the image to spread out those peaks in the image histogram, so that more details in low-contrast regions in the image can be better shown. FIG. 3E displays a resulting image after intensity normalization by using this method. Alternatively, other known techniques, such as the tone scale method disclosed in U.S. Pat. No. 5,633,511 issued on 1997 by Lee et al. entitled AUTOMATIC TONE SCALE ADJUSTMENT USING IMAGE ACTIVITY MEAURES, can be used to provide normalization. It is noted that the present invention is not limited to using the above methods to normalize the image. Known algorithm(s) of similar nature can be employed to achieve consistent intensity and contrast for radiographs.

The orientation correction (step 11) of a radiograph comprises detecting the orientation of the radiograph and reorienting it into the position preferred by radiologists. The orientation detection can be accomplished using methods known to those skilled in the art. One suitable method is disclosed in commonly assigned U.S. Ser. No. 10/993,055, entitled "DETECTION AND CORRECTION METHOD FOR RADIOGRAPH ORIENTATION", filed on Nov. 19, 2004 in the names of Luo et al, and which is assigned to the assignee of this application, and incorporated herein by reference.

Due to the examination condition, the size and position, as well as orientation of anatomy from the same examination would be varying. In addition, the portion of anatomy shown in the radiograph is also varied depending on the patient's situation and the setting of collimation blades. These factors may result in the different appearances of radiographs, which pose challenges to the orientation recognition.

To solve these problems, a Region of Interest (ROI) is extracted from the radiograph. The ROI is intended to capture the diagnostically useful part from image data, and minimize the distraction and interference caused by the factors mentioned above. With the help of this ROI, the projection view recognition can focus on the diagnostically important region. To this end, the ROI extraction method (step 12) includes two steps: detecting a medial axis of anatomy in the radiograph and locating the ROI accordingly.

According to the present invention, the medial axis is used to describe the anatomy in radiographs. Using the medial axis is attractive in that it provides a simple description of position and orientation of anatomy in radiographs, and greatly helps limit search complexity and expedites processing.

Figure 4A:
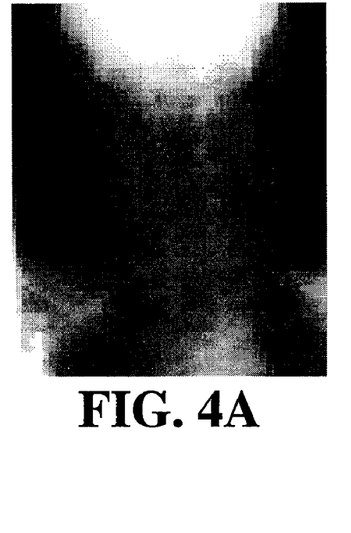
FIG. 4A shows the original image.
Figure 4B:
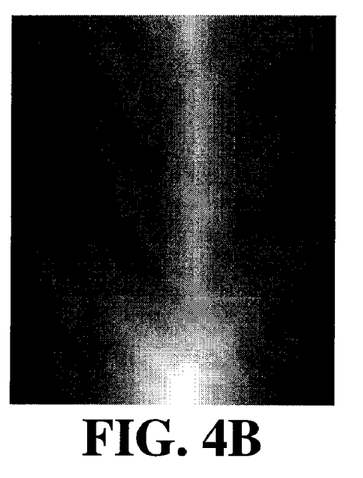
FIG. 4B is the Euclidean distance map calculated from the anatomy image.
Figure 4C:
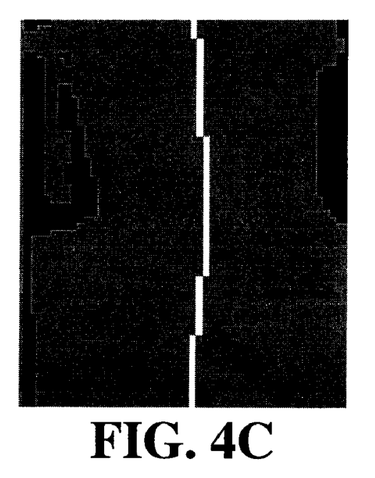
FIG. 4C displays the medial axis detected from the anatomy image.

In a preferred embodiment of the present invention, the medial axis can be detected by using the Euclidean distance map. During the implementation, the contour of anatomy is detected and used to calculate Euclidean distance map as shown in FIG. 4B for the image shown in FIG. 4A. Then the maximum ridge is detected and used as the medial axis. FIG. 4C depicts a resultant medial axis. This method is particularly suited for the radiographs of extremities, such as elbow, knee, and wrist, which tend to have well-defined medial axes, even though the shapes can be complex.

In another embodiment of the present invention, the medial axis can be detected by Multiscale Medial Analysis (Morse et. al. "Multiscale Medial Analysis of Medical Images", Image and Vision Computing, Vol 12 No. 6, 1994). An advantage of using MMA is that it works directly on image intensities, and does not require a prior segmentation of the image or explicit determination of object boundaries.

ROI extraction starts with searching for the center of ROI, followed by determining the size and shape of ROI based on the features of the anatomy.

Figure 5A:
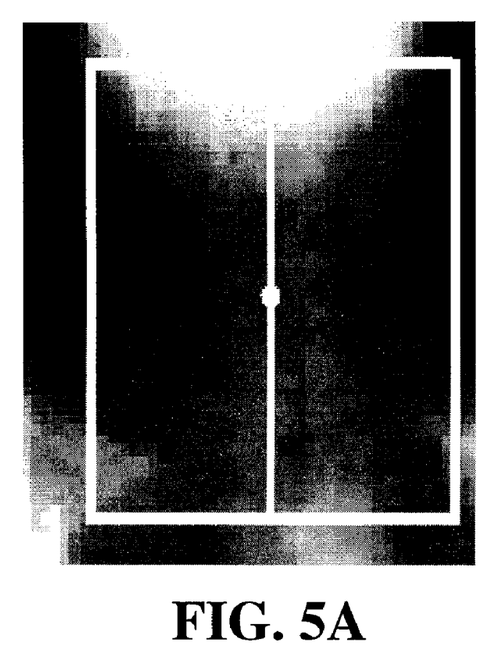
FIG. 5A depicts the region of interest extracted from the cervical spine radiograph.

In accordance with the present invention, the center of ROI is dependent on the characteristics of the anatomy in the examination. For example, in the radiographs of cervical spine examination, the center of ROI is located at the center of neck, as shown in FIG. 5A. For the radiographs of hand, the center of palm can be used as the center of ROI as shown in FIG. 5B.

The size of ROI is related to the size of the anatomy in radiographs, which can be derived from the anatomy image with the help of the medial axis. According to the present invention, the size of ROI is proportional to the minimal distance from the edge of anatomy to the medial axis.

Regarding the shape of the ROI, two types of shapes are preferably employed in the present invention. One is a rectangle shape, the other is an adapted shape aligned with the medial axis. With an adapted shape, the medial axis provides the position and orientation information of anatomy in radiograph, so adapting the shape of ROI along the medial axis can help reduce the effects caused by translation and rotation and ensure that the ROI is translation- and rotation-invariant, which in turn ensures that the whole projection view recognition method is robust.

Figure 5B:
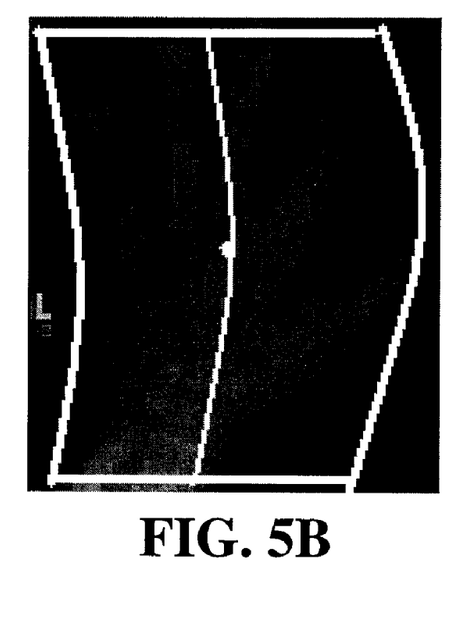
FIG. 5B shows the region of interest found in the hand radiograph. The white dot represents the center of ROI.

FIGS. 5A and 5B show examples of the different shapes of ROI extracted from radiographs of different anatomy objects. In FIG. 5A, the medial axis of cervical spine is nearly straight, so the shape of ROI is rectangle. For some other anatomies, such as hand, the medial axis may not always hold straight. As a result, the shape of ROI may appear as a twisted or slanted strip surrounding the medial axis, as shown in FIG. 5B. The choice of the ROI shape is largely dependant on how it affects the performance of recognition. If a simple rectangle shape can satisfy the requirements, it will be adopted; otherwise a more complicated adapted shape will be considered.

In order to compute features for projection view recognition, the ROI is further divided into N*N blocks and a set of low-level visual features are computed from sub-blocks. The number of sub-blocks is determined empirically to balance the trade off between the computation complexity and recognition performance. In accordance with the present invention, possible low-level features could be the gray level mean, variance, edge information, texture and other image features extracted from sub-blocks.

Having completed the feature extraction, the obtained low-level visual features needs to be normalized over the entire collection of training examples to accommodate the scale difference during the feature extraction. The scaled i th feature component, $x_i$ of a feature vector, x, is calculated as:

$$x_i = x_i - min_i | max_i - min_i$$

where $min_i$ and $max_i$ represent the range of the i th feature component $x_i$ of x over the training examples.

Figure 6:
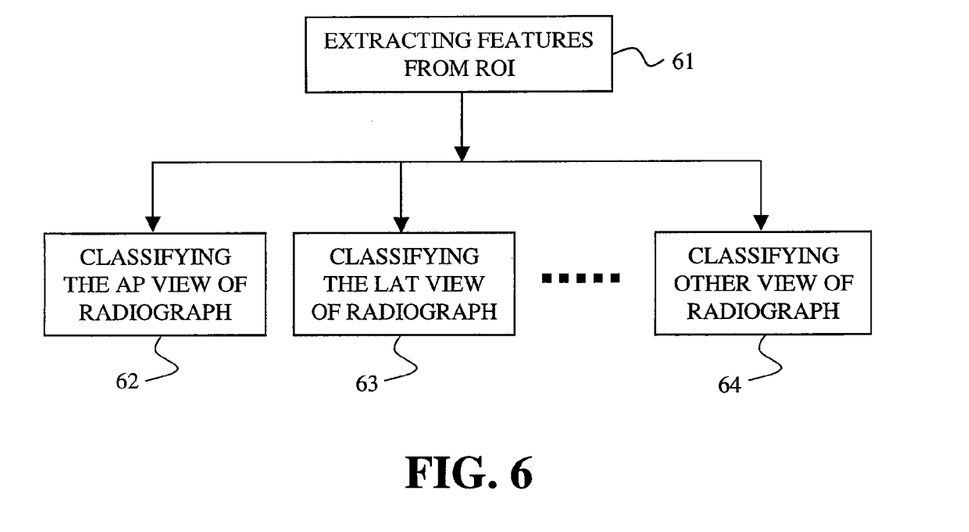
FIG. 6 shows a flow chart illustrating the classification of radiograph with respect to all possible views.

Reference is now made to FIG. 6, wherein projection view classification is accomplished by a set of pre-trained classifiers. Each classifier is trained to classify one projection view from all the others, and its output represents how closely the input radiograph match such projection view. The number of classifiers equals to the total number of projection views that an examination can possibly have. For example, chest radiographs generally have four projection views, anterior-posterior view (AP), posterior-anterior view (PA), lateral view (LAT) and oblique view (OBL). Therefore four classifiers are needed to classify chest radiographs.

According to an embodiment of the present invention, a method is provided to create such classifiers. This method is composed of a training step and a testing step.

During the training step, a collection of training images is first obtained with known target projection view information. Next, a set of extracted features from individual training images and their associated target outputs, which specify the correct or incorrect projection view, are used to train a classifier. The classifier can be any of methods known in the art, such as a neural network and support vector machine. If the original features are not effective for classification, an optional step can be added, which computes a suitable transformation from the original features. The benefit of adding this step is to further study the characteristics of training features and derive the most discriminate features for classification. Examples of such transformations include normalization, feature extraction by principle component analysis (PCA) or independent component analysis (ICA), or a non-linear transformation to create secondary features. For more information on classifiers and feature extraction, see Duda, Hart, and Stork, Pattern Classification, John Wiley & Sons, New York, 2001.

Accordingly, a set of a pre-trained classifiers can be obtained by the steps of: collecting a pre-determined number of training images with known projection view information; locating a region of interest for each of the training images; computing a set of features from the region of interest of each of the training images; associating a target output specifying the known projection view of each of the training images; computing a transformed feature set for each of the training images using principal component analysis based on all the training images; and training a classifier with the transformed feature set and target output.

Once the classifier is trained, a testing step is performed on novel images to evaluate the performance of classification. If the performance cannot satisfy the pre-set requirement, the classifier may be biased by, or overfit the training data. When this happens, the classifier can be retrained until it performs best on both training and testing data.

Referring again to FIG. 6, features described above are extracted from the ROI of a novel radiographic image (step 61). Upon obtaining results from the set of pre-trained classifiers for classifying the various projection views (e.g., AP, LAT, and others, steps 62, 63, 64), the final step is to determine the most likely projection view of the input radiograph by combining the outputs of the classifiers (step 65, new in FIG. 6). In a preferred embodiment of the present invention, Bayesian decision rule is used to combine the results from classifiers and infer the projection view of radiograph as the one with the highest confidence.

The present invention may be implemented for example in a computer program product. A computer program product may include one or more storage media, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The system of the invention can include a programmable computer having a microprocessor, computer memory, and a computer program stored in said computer memory for performing the steps of the method. The computer has a memory interface operatively connected to the microprocessor. This can be a port, such as a USB port, over a drive that accepts removable memory, or some other device that allows access to camera memory. The system includes a digital camera that has memory that is compatible with the memory interface. A photographic film camera and scanner can be used in place of the digital camera, if desired. A graphical user interface (GUI) and user input unit, such as a mouse and keyboard can be provided as part of the computer.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST

10 Acquiring a radiographic image
11 Correcting the orientation of the radiograph
12 Extracting Region of interest from the radiograph
13 Recognizing the projection view of radiograph
14 Preprocessing the radiograph
15 Classifying the radiograph
16 Determining the projection view of the radiograph
20 Sub-sampling the image
21 Segmenting the image into foreground, background and anatomy regions
22 Removing foreground and background regions
23 Normalizing the rest of image
61 Extracting features from ROI
62 Classifying the AP view of radiograph
63 Classifying the LAT view of radiograph
64 Classifying the other view of radiograph

The invention claimed is:

1. A method for recognizing the projection view of radiographs, comprise the steps carried out by a programmable digital computer of:
   accessing an input radiograph;
   preprocessing said input radiograph to extract the anatomy of the radiograph:
   correcting the orientation of the radiograph;
   extracting a region of interest from said anatomy of the radiograph;
   computing projection view sensitive features from the region of interest: and
   recognizing the projection view of the radiograph, based on said projection view sensitive features, using a set of pretrained classifiers.

2. The method of claim 1, wherein the step of extracting the region of interest is accomplished by the steps of:
   detecting a medial axis;
   locating a center of the region of interest;
   determining a size and shape of the region of interest; and
   extracting the region of interest.

3. The method of claim 2, wherein the step of medial axis is detected using an Euclidean distance map or by a multiscale medial analysis.

4. The method of claim 1, wherein the step of recognizing the projection view of the radiograph is accomplished by the steps of:
- classifying the radiograph using a set of pre-trained classifiers corresponding to all possible projection views; and
- determining the projection view of the radiograph as the one with the highest confidence according to the classification results.

5. The method of claim 1, wherein a set of a pre-trained classifiers is obtained by the steps of:
- collecting a pre-determined number of training images with known projection view information;
- locating a region of interest for each of the training images;
- computing a set of features from the region of interest of each of the training images;
- associating a target output specifying the known projection view of each of the training images;
- computing a transformed feature set for each of the training images using principal component analysis based on all the training images; and
- training a classifier with the transformed feature set and target output.

6. The method of claim 1, wherein the step of pre-processing the radiograph comprises the steps of:
- sub-sampling the radiograph;
- segmenting the radiograph into a foreground region, a background region, and an anatomy region;
- removing the foreground and background regions from the radiograph to generate an anatomy image; and
- normalizing the anatomy image based on characteristics of the anatomy region.

7. The method of claim 1 wherein said step of computing projection view sensitive features from the region of interest comprises:
- dividing the region of interest into a set of blocks; and
- computing a set of low-level visual features from the blocks.

8. The method of claim 7 wherein said step of computing projection sensitive features includes studying the characteristics of the low-level visual features, and deriving the most discriminate features from the low-level visual features for classification by using normalization, principle component analysis, independent component analysis, or other feature extraction methods.

9. The method of claim 7, wherein the low-level visual features include gray level mean, variance, edge information, texture and other image features extracted from a block.

* * * * *